United States Patent [19]

Condon

[11] 4,408,782
[45] Oct. 11, 1983

[54] GRAPHIC MEANS AND METHOD FOR MAXIMIZING UTILIZATION OF CARGO SPACE

[75] Inventor: Edward L. Condon, Oak Park, Ill.

[73] Assignee: Merriam, Marshall & Bicknell, Chicago, Ill., part interest

[21] Appl. No.: 226,198

[22] Filed: Jan. 19, 1981

[51] Int. Cl.³ .............................................. B42D 15/00
[52] U.S. Cl. ........................................ 283/70; 53/411; 53/475; 283/73; 283/80; 283/81; 283/114; 283/901; 414/786
[58] Field of Search ................... 283/1 R, 1 A, 18, 19, 283/20, 21, 55, 901, 81, 80, 79, 67, 70, 73, 74, 114; 53/411, 475; 414/28, 57, 786

[56] References Cited

U.S. PATENT DOCUMENTS

| | | | |
|---|---|---|---|
| 327,260 | 9/1885 | Hart | 283/21 |
| 384,237 | 6/1888 | DeWitt | 283/19 |
| 1,196,749 | 8/1916 | Murphey | 283/18 |
| 1,267,407 | 5/1918 | Harrison | 283/18 X |
| 3,279,145 | 10/1966 | Williamson | 53/475 |
| 3,729,895 | 5/1973 | Kramer et al. | 53/59 R |
| 3,730,357 | 5/1973 | Beaty, Jr. et al. | 214/6 DK |
| 3,987,960 | 10/1976 | Gardiner | 229/74 |
| 4,180,284 | 12/1979 | Ashley | 283/20 |

FOREIGN PATENT DOCUMENTS 565937 12/1944 United Kingdom .................. 283/18

OTHER PUBLICATIONS

Compucon Inc.—Computer Generated Loading Pattern P.O. Box 401229, 13749 Neutron Road, Dallas, Texas 75240.
MAV Systems, Inc.—Computer Generated Loading Pattern 235 Fifth Avenue, New York, New York 10016.

*Primary Examiner*—Paul A. Bell
*Attorney, Agent, or Firm*—Merriam, Marshall & Bicknell

[57] ABSTRACT

Graphic means in the form of one or more symbols applied to one or more of the panels of a plurality of cargo containers to be loaded in a cargo receiving space, such as the cargo receiving space of a vehicle. The symbols provide graphic instructions to a loader as to how the cargo containers should be oriented in the cargo space of a vehicle in order to obtain a loading pattern which substantially maximizes the number of cartons that can be loaded in the cargo receiving space. The loading pattern obtained from the graphic instructions provided by the symbols also serves to reduce the clearance between the cartons and the walls of the cargo receiving space and hence the possibility of damage to cargo in the containers or cartons due to shifting while in transit. Numbers, letters, arrows or other indicia may be incorporated into or associated with the symbols to provide further instructions for loading cargo elements of the same size in different orientations in tiers of rows extending transversely across different sized cargo spaced in different vehicles.

A novel method of loading cargo elements in a cargo receiving space, such as the cargo receiving space of a vehicle, is also disclosed which includes the steps of determining the optimum loading pattern which will substantially maximize the number of cargo elements that can be loaded in the cargo space, applying one or more symbols to one or more of the surfaces of each cargo element which provides graphic instructions to a loader as to the manner in which the cargo elements are to be loaded in the cargo receiving space to obtain the optimum loading pattern, and loading the cargo receiving space in accordance with the loading instructions provided by the symbols on the cartons. The method also contemplates the additional steps of including or associating numbers and letters with the symbols applied to the panels of each cargo element to provide specific instructions for loading the cargo elements or cartons in particular vehicles having cargo receiving spaces of certain dimensions in order to obtain the optimum loading pattern.

27 Claims, 16 Drawing Figures

GRAPHIC MEANS AND METHOD FOR MAXIMIZING UTILIZATION OF CARGO SPACE

BACKGROUND OF THE INVENTION

1. Field of the Invention

This invention relates to the loading of cargo in a cargo receiving space, and more particularly relates to graphic means for providing graphic instructions to freight loaders and handlers for loading cargo elements in a cargo receiving space in order to maximize the number of cargo elements in the space and the method of doing the same.

2. Description of the Prior Art

Freight handlers and carriers have long recognized the desirability of obtaining maximum utilization of the cargo space in the freight transporting vehicles. With the development of computer technology, it is now possible to obtain a computer printout, in the form of a loading diagram or written instructions for loading both palletized and unpalletized cargo elements in a pattern that will substantially maximize the number of elements that can be fitted into the cargo receiving space of a particular freight vehicle.

While loading diagrams and/or printed instructions are thus available from various sources for loading cargo elements of a given size in an optimum arrangement in a cargo receiving space of a particular vehicle, such loading diagrams and printed instructions must be studied or read by the freight handlers or loaders, or explained to them by supervisory personnel. Consequently, a considerable amount of time can be expended by the individuals involved in carrying out the cargo loading instructions contained in loading diagrams or written instructions, which is undesirable and uneconomical.

In addition, because of the large number of freight transporting vehicles presently in use, it is practically impossible to provide a loading diagram or written instructions for loading cargo elements or boxes of a particular size in an optimum manner in the cargo space of a particular vehicle for each loading operation. Moreover, while it is assumed that freight handlers attempt to load cargo vehicles to capacity, without guidance, the total load achieved is frequently less than the total capacity of the vehicle.

SUMMARY OF THE INVENTION

Briefly described, in its broader aspects, the present invention contemplates graphic means in the form of one or more symbols applied to one or more of the panels of a plurality of containers or cartons to be loaded in a cargo receiving space, such symbols providing graphic instructions for substantially maximizing the number of cartons loaded in the space. In its more specific aspects, the present invention contemplates one or more symbols applied to one or more of the panels of a plurality of shipping containers or cartons, which provide graphic instructions to a loader as to how the containers should be oriented in the cargo space of a vehicle in order to obtain a desired loading pattern for maximizing the number of cartons that can be loaded in the cargo receiving space of the vehicle. The graphic instructions provided by the symbols of the present invention also serve to reduce the possibility of damage to cargo in the containers or cartons due to shifting while in transit. In addition, numbers, letters, arrows or other indicia may be incorporated into or associated with the symbol to provide further instructions for loading cargo elements of the same size in different orientations in tiers of rows extending transversely across different sized cargo spaces in different vehicles.

The present invention also contemplates a novel method of loading cargo elements in the cargo space of a vehicle in order to substantially maximize the number of cargo elements loaded into the space. Such method includes the steps of determining the optimum loading pattern which will substantially maximize the number of cargo elements that can be loaded in the cargo space, applying a symbol to one or more of the panels of each cargo element which provides graphic instructions to a loader as to the manner in which the cargo elements are to be loaded in the space to obtain the optimum loading pattern, and loading the cargo space in accordance with the loading instructions provided by the symbols on the cartons. The cargo loading method of the present invention also contemplates the additional steps of including or associating numbers and letters with the symbols applied to the panels of each cargo element to provide specific instructions for loading the cargo elements in particular vehicles having cargo receiving spaces of certain dimensions in order to obtain the optimum loading pattern.

DESCRIPTION OF THE PREFERRED EMBODIMENTS

Figures 1, 2, 3, 6:
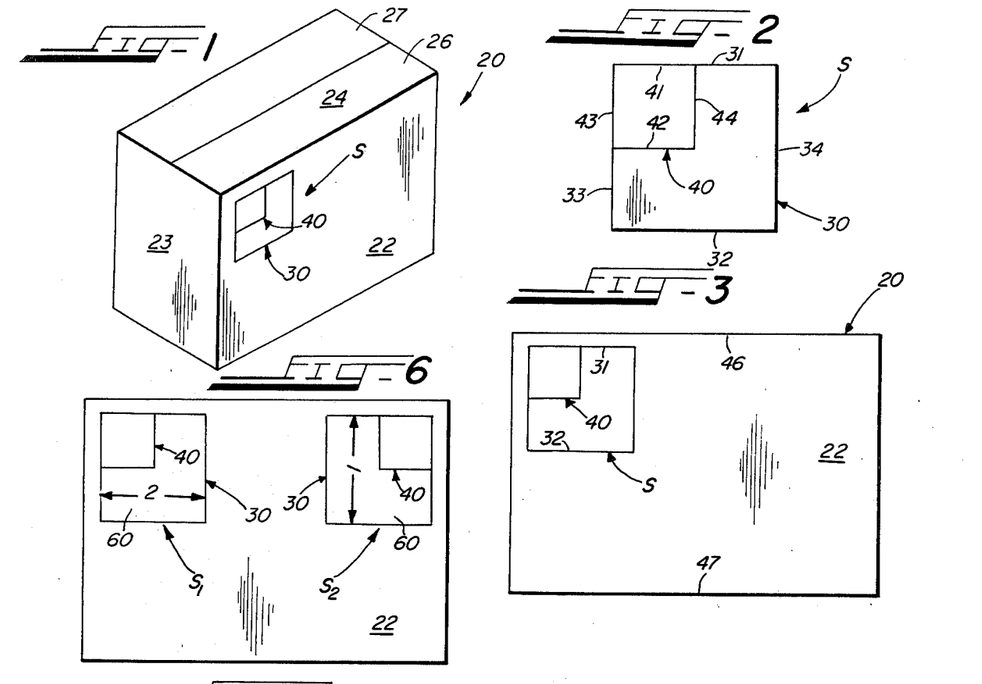
FIG. 1 is a perspective view of a carton having a symbol embodying the principles of the present invention applied to one of the panels thereof.
FIG. 2 is an enlarged elevational view of the graphic symbol on the panel of the carton illustrated in FIG. 1.
FIG. 3 is a front elevational view of the panel of the carton illustrated in FIG. 1 having the symbol shown in detail in FIG. 2 applied thereto.
FIG. 6 is an enlarged, front, elevational view, similar to FIG. 3, of the facing panel of one of the cartons illustrated in FIG. 5 and having a pair of the symbols of the present invention applied thereto.

Referring initially to FIG. 1, a cargo element in the form of a carton is illustrated and indicated generally at 20. The carton 20 is exemplary of the type used to ship items of cargo from points of manufacture or distribution to wholesale and retail outlets. The carton 20 is thus generally of cube-like form and has four upstanding panels, one of the side panels of which is indicated in FIG. 1 at 22, one of the end panels of which is indicated at 23, and the top panel of which is indicated at 24 and provided by two, folded-over halves 26 and 27. The other side panel, end panel, and bottom panel of the carton 20 are not shown in FIG. 1.

Referring now to FIGS. 2 and 3 in conjunction with FIG. 1, it will be seen that graphic means in the form of a symbol S is present on the outer surface of the panel 22 of the carton 20 for providing graphic instructions to a loader of a plurality of the cartons 20 as to how to load the cartons in a cargo receiving space, such as the cargo receiving spaces of highway trailers, boxcars, air and ocean containers, and private vans, so as to maximize the number of cartons that can be loaded into such spaces.

As best seen in FIG. 2, the symbol S includes a first portion, which is preferably in the form of a rectangle 30, specifically a square, having horizontally extending, vertically spaced upper and lower sides 31 and 32 and vertically extending, laterally spaced left and right sides 33 and 34, respectively.

The symbol S also includes a second portion associated with the first portion 30 for rendering the orientation of the symbol, and hence the carton to which the symbol is applied, is rapidly and easily recognizable. The second portion is also preferably in the form of a rectangle 40, specifically a square, which is smaller than, similar to and disposed within the rectangle 30. The square 40 thus includes horizontally extending vertically spaced upper and lower sides 41 and 42 and laterally spaced, vertically extending left and right sides 43 and 44, respectively. As best seen in FIG. 2, the square 40 is disposed in the upper left quadrant of the square 30 so that the upper side 41 and left side 43 of the square 40 are coincident with portions of the upper side 31 and left side 33 of the square 30.

Figure 4:
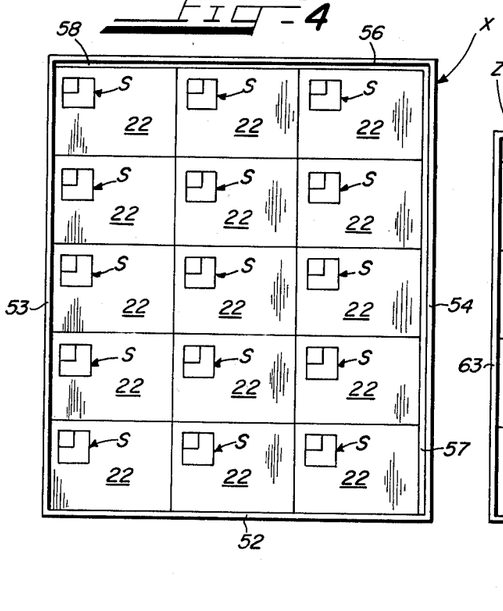
FIG. 4 is a diagrammatic elevational view, looking toward one end of a railroad boxcar from the center thereof and showing a plurality of the cartons illustrated in FIG. 1 as they would appear when loaded in a pattern which substantially maximizes the number of cartons in the cargo space of the boxcar.

Referring now to FIG. 4 in conjunction with FIGS. 1, 2 and 3, a plurality of the cartons 20 having the symbol S on one of the panels thereof, in the present instance the panel 22, are shown as they would appear when loaded into a portion of the cargo receiving space of a boxcar, indicated generally at X, with the symbols on the panels 22 of the cartons facing inwardly or toward the center doors of the car. The cargo receiving space of the boxcar X is defined by a floor 52, laterally spaced, vertically extending left and right side walls 53 and 54, respectively, and a roof 56. For purposes of illustration, it will be assumed that the internal dimensions of the cargo receiving space of the boxcar X are 102 inches wide, 122 inches high and 40 ft. long. It will also be assumed that the dimensions of each of the cartons 20 loaded into the boxcar X are 33 inches long, 16 inches wide and 24 inches high.

It will thus be apparent from FIG. 4 that when the cartons 20 are loaded into the boxcar X with the symbols S on the panels 22 of each carton oriented so that the smaller rectangle 40 thereof is located in the upper left quadrant of the larger rectangle 30, the 33 inch dimension of each carton will extend horizontally and the 24 inch dimension of each carton will extend vertically. Consequently, if the cartons 20 are loaded into the cargo space of the boxcar X so that the end panel 22 of the first carton in each transverse row is engaged with the inner side of the left wall 53 of the boxcar and so that the end panels of the adjacent cartons in each transverse row are all in contact with each other, only 3 inches of clearance space, indicated at 57 in FIG. 4, will be present between the inner surface of the right side wall 54 of the boxcar X and the outer surface of the end panel of the carton 20 adjacent to the side wall 57. Also, with the cartons 20 oriented as illustrated in FIG. 4 and arranged in five tiers of transverse rows, only 2 inches of space, indicated at 58, will be present between the underside of the boxcar roof 56 and the top panels 24 of the upper transverse row of cartons.

Thus, the symbols S on the cartons 20 illustrated in FIG. 4 provide graphic instructions to the individual or individuals loading the cartons 20 into the boxcar X for loading the same in a pattern which substantially maximizes the number of cartons that can be loaded into the boxcar X, merely by ascertaining that, as each carton is loaded, the symbol S on each carton faces the center of the car and that the smaller rectangle 40 of each symbol S is oriented in the upper left quadrant of the larger rectangle 30. In addition, the minimal clearance spaces between the cartons 20 and the inner surfaces of the side walls and roof of the boxcar X minimize the possibility of damage to the cartons and their contents while in transit since there is little room for shifting of the cartons.

Figure 5:
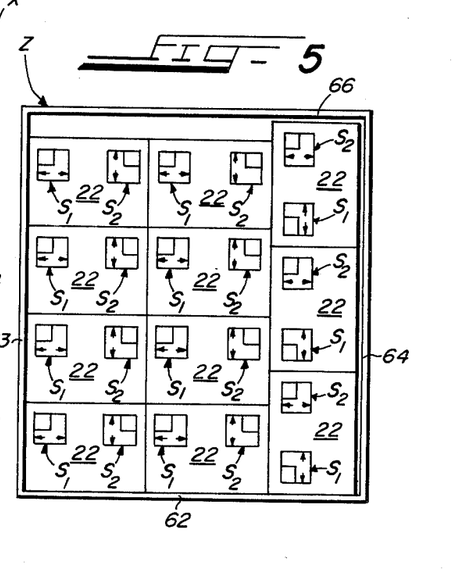
FIG. 5 is a diagrammatic elevational view, looking into the open rear end of a highway trailer and showing a plurality of cartons having the same dimensions as the carton illustrated in FIG. 1 as they would appear when loaded in a pattern which substantially maximizes the number of cartons in the cargo space of the trailer, each of the cartons illustrated in FIG. 5 having a pair of the symbols of the present invention applied to one of the panels thereof.

Referring now to FIG. 5 in conjunction with FIGS. 1, 2 and 3, a plurality of the cartons 20 are shown as they would appear when loaded into the cargo carrying space of a highway trailer, indicated generally at Z. In the present instance, the cargo carrying space of the trailer Z is defined by a floor 62, laterally spaced, vertically extending left and right side walls 63 and 64, respectively, and a ceiling or roof 66. It will be assumed that the internal dimensions of the cargo space of the trailer Z are 470 inches long, 92 inches wide and 102 inches high. It will also be assumed that the dimensions of the cartons loaded in the cargo space of the trailer Z are identical with those of the carton 20, i.e. 33 inches long, 16 inches wide and 24 inches high.

Assuming that a computer or other analysis has been made to determine the loading pattern which will substantially maximize the number of cartons 20 that can be loaded into the cargo receiving space of the trailer Z, and that such arrangement is as illustrated in FIG. 5, the present invention contemplates the application of two symbols to the panel 22 of each carton in order to provide graphic instructions to a loader as to how to load the cartons to obtain this pattern.

Referring now to FIG. 6 in conjunction with FIG. 5, it will be seen that the two symbols applied to the panel 22 are indicated at $S_1$ and $S_2$ and are preferably applied to the panel 22 of each carton adjacent the upper left and right hand corners thereof, respectively. The symbols $S_1$ and $S_2$ are the same as the symbol S in that they comprise a rectangle 30, specifically a square, and a smaller rectangle 40, specifically a square, disposed within the rectangle 30. As with the symbol S, the position of the smaller rectangle 40 in the rectangle 30 defines the proper orientation of the carton in a transverse row thereof in the cargo receiving space.

The symbols $S_1$ and $S_2$ differ from the symbol S in that indicia in the form of a numeral is provided in the space, indicated at 60, between the rectangle 30 and rectangle 40 to indicate the number of cartons to be loaded in each transverse row thereof. Thus, in the case of the symbol $S_1$, the numeral "2" is provided in the space 60 and a pair of arrows extend in opposite directions from the numeral, the arrows also serving to indicate the proper orientation of the carton when loaded in the cargo space of the trailer Z, i.e. the arrows extend horizontally as viewed in FIG. 6.

The symbol $S_2$ differs from the symbol $S_1$ in that the smaller rectangle 40 is in the upper right quadrant of the square 30, as viewed in FIG. 6. Since this is an improper orientation for the smaller square 40, a loader is thus graphically instructed to rotate the carton counterclockwise through an angle of 90° before loading the same into the cargo space in order to obtain the proper relationship of the smaller square 40 in the larger square 30 i.e. with the smaller square 40 in the upper left hand quadrant of the square 30. The three cartons adjacent to the right wall 64 of the trailer Z in FIG. 5 illustrate the proper orientation of these cartons when loaded in accordance with the instructions conveyed by the symbol $S_2$.

Since the loading pattern illustrated in FIG. 5 requires only one of the cartons to be oriented with its longer dimension extending vertically, the number "1" is placed in the space 60. In addition, a pair of arrows extend in opposite directions from the number "1" to further assist the loader in properly orienting one of the cartons with its longer dimension extending vertically, i.e. the arrows adjacent the number "1" will extend horizontally when this carton is properly oriented.

In summary, the symbols $S_1$ and $S_2$, including the numbers "2" and "1" provide graphic instructions to a loader for loading two of the cartons 20 with the longer dimensions thereof extending horizontally and one of the cartons 20 with the longer dimension thereof extending vertically in tiers of transverse rows across the cargo space of the trailer Z. The pattern is repeated for the length of the trailer to thus substantially maximize the number of cartons loaded therein and minimize the clearance space between the cartons and the adjacent walls of the trailer. Such minimum clearance space also reduces the possibility of damage to the contents of the cartons due to shifting in transit.

It will be understood that, depending upon the internal dimensions of the cargo space in which the cartons are to be loaded, and the dimensions of the cartons, the location and orientation of the symbols $S_1$ and $S_2$ on the panels of the cartons to be loaded could be other than that illustrated in FIG. 6, and that the numbers in the spaces 60 of the symbols could differ from those illustrated in FIG. 6.

Figure 7:
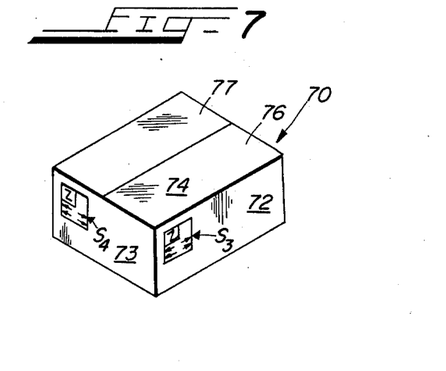
FIG. 7 is a perspective view of another carton having a pair of graphic symbols embodying the features of the present invention respectively applied to two of the panels thereof.

Referring initially to FIG. 7, another cargo element in the form of a carton is illustrated and indicated generally at 70. The carton 70 is similar to the carton 20 in that it is also of cube-like form and has four upstanding panels or walls, one of the side panels of which is indicated at 72, one of the end panels of which is indicated at 73, and the top panel of which is indicated at 74 and provided by two, folded-over halves 76 and 77.

In order to explain another feature of the present invention, it will be assumed that the carton 70 is of a different size than the carton 20. Specifically, it will be assumed that the carton 70 is 20 inches long, 16 inches wide, and 10 inches high. It will further be assumed that a plurality of the cartons 70 are to be loaded into the cargo receiving space of two highway trailers, respectively indicated at $Z_1$ and $Z_2$, with the 10 inch dimension of all the cartons extending vertically. The trailers $Z_1$ and $Z_2$ are similar to the trailer Z in that the cargo receiving spaces thereof are of cube-like form.

Figure 10:
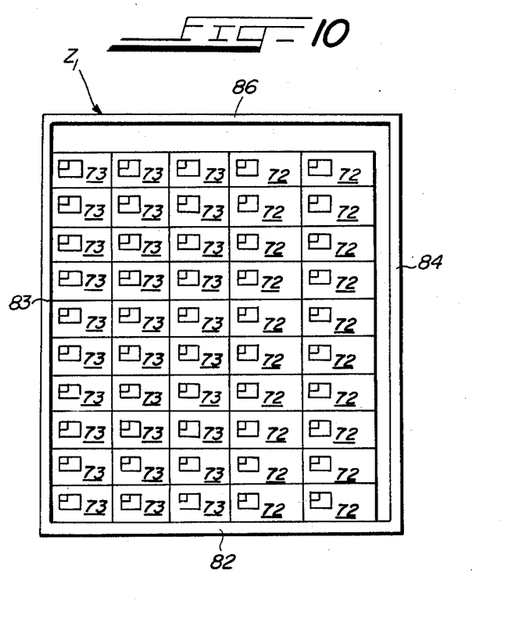
FIG. 10 is a diagrammatic elevational view, looking into the open rear end of a highway trailer and showing a plurality of the cartons illustrated in FIG. 7 as they would appear when loaded in the cargo receiving space of a trailer such that the number of cartons loaded into this trailer is substantially maximized.

The cargo receiving space of the trailer $Z_1$ is thus defined in part by a floor 82, laterally spaced, vertically extending left and right side walls 83 and 84, respectively, as viewed in FIG. 10, and a ceiling or roof 86. It will be assumed that the dimensions of the cargo receiving space of the trailer $Z_1$ are 471 inches long, 91 inches wide and 108 inches high.

Figure 11:
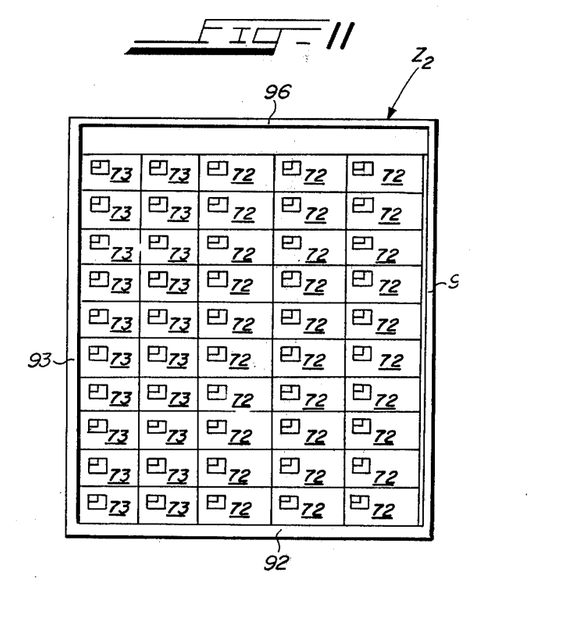
FIG. 11 is a view similar to FIG. 10 but showing a plurality of the cartons illustrated in FIG. 7 as they would appear when loaded in the cargo receiving space of another trailer such that the number of cartons loaded into this trailer is substantially maximized.

The cargo receiving space of the trailer $Z_2$ is likewise defined in part by a floor 92, laterally spaced, vertically extending left and right side walls 93 and 94, respectively, as viewed in FIG. 11, and a ceiling or roof 96. It will further be assumed that the dimensions of the cargo receiving space of the trailer $Z_2$ are 471 inches long, 92 inches wide and 108 inches high.

Assuming that a cargo handler or loader has instructions to load the trailers $Z_1$ and $Z_2$ with as many of the cartons 70 as possible, but with the restriction that the 10 inch dimension of each carton has to remain vertical, if the cartons 70 were loaded in the trailer $Z_1$ in tiers of transverse rows with the panel 73 of each carton facing the loader, a maximum of 1,150 cartons would be loaded into the cargo space of a trailer $Z_1$. Alternately, if the cartons 70 were loaded in the cargo space of the trailer $Z_2$ in tiers of transverse rows with the panel 72 of each carton facing the loader, a maximum of 1,160 cartons could be loaded into the trailer $Z_2$.

A computer or other type of analysis of the dimensions of the cargo carrying spaces of the trailers $Z_1$ and $Z_2$, when loaded with cartons having the dimensions of the carton 70 indicates, however, that a greater number of cartons can be loaded into the cargo spaces of the trailers $Z_1$ and $Z_2$ than would be obtained if all of the cartons were loaded with either their 16 inch or 20 inch dimensions extending transversely across the length of the trailers. Thus, a maximum of 1,270 cartons could be loaded into the cargo space of the trailer $Z_1$ if the cartons 70 are arranged so that the panels 73 i.e. the 16 inch wide panels, of three of the cartons face the loader and the panels 72 i.e. the 20 inch wide panels of two of the cartons face the loader. In the case of the trailer $Z_2$, 1,330 cartons can be loaded into the cargo space of this trailer if the cartons 70 are loaded so that the panels 73 i.e. the 16 inch wide panels, of two of the cartons face the loader and the panels 72 i.e. the 20 inch wide panels, of three of the cartons face the loader.

Since it has been assumed that cartons having the dimensions of the carton 70 are to be loaded into the cargo space of the trailers $Z_1$ and $Z_2$, two symbols embodying the features of the present invention, respectively indicated at $S_3$ and $S_4$, are respectively applied to the panels 72 and 73 of each carton to graphically instruct a loader as to how the cartons should be loaded in the trailers $Z_1$ and $Z_2$ to obtain the loading patterns illustrated in FIGS. 10 and 11. Such symbols are illustrated in greater detail in FIGS. 8 and 9.

Figure 8:
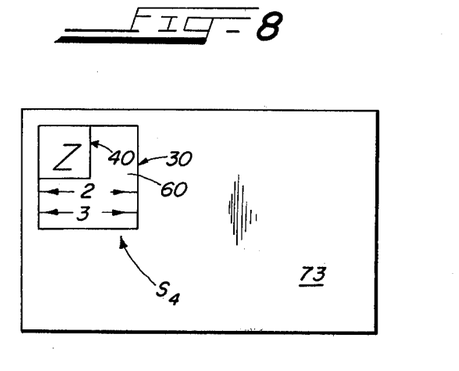
FIGS. 8 and 9 are elevational views of the end and side panels of the carton illustrated in FIG. 7.
Figure 9:
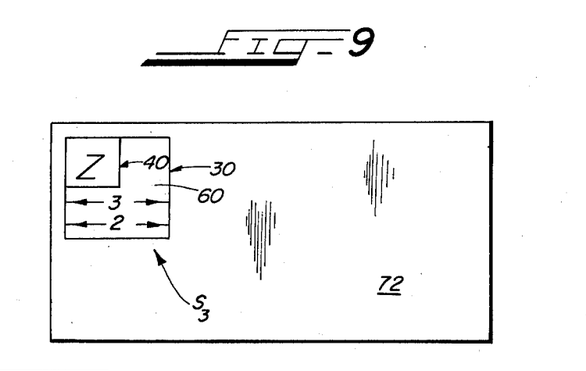

As will be apparent from FIGS. 8 and 9, the symbols $S_3$ and $S_4$ are similar to the symbols $S_1$ and $S_2$. Consequently, like reference numerals have been used to identify identical parts. Thus, each of the symbols $S_3$ and $S_4$ includes a first, rectangular portion 30, which is preferably square, and a second, smaller, rectangular portion 40, which is also preferably a square and enclosed by the rectangle 30. The rectangular portions 40 are likewise positioned in the upper left quadrant of the rectangle 30 when the cartons to which they are applied are properly oriented.

The symbols $S_3$ and $S_4$ are further similar to the symbols $S_1$ and $S_2$ in that the symbols $S_3$ and $S_4$ also include indicia in the space 60 between the rectangles 30 and 40 providing further graphic instructions as to the loading of the cartons in a cargo space. Such indicia comprises a pair of numerals in the space 60, and a letter, in the present instance the letter "Z", in the smaller rectangle 40 to indicate that the graphic instructions contained on the carton 70 pertain only to loading the cartons in a highway trailer. The letter "Z" is used in the freight handling and transporting industry to identify highway trailers.

In connection with the numbers in the larger rectangle 30 of the symbols $S_3$ and $S_4$, it will be noted that the number "3" is arranged in superposed relation above the number "2" in the rectangle 30 of the symbol $S_3$ and that the number "2" is arranged in superposed relation above the number "3" in the rectangle 30 of the symbol $S_4$. In addition, the numbers "3" and "2" in the symbol $S_3$ are in substantially the same vertical position as are the number "2" and "3" in the symbol $S_4$. Moreover, two pairs of arrows extend horizontally from each of the numbers "2" and "3" in the space 60 of each of the symbols $S_3$ and $S_4$.

The foregoing relationship of the numbers "2" and "3" in the symbols $S_3$ and $S_4$ permit a cargo handler or loader to quickly determine whether or not the cartons are being loaded in an optimum manner in either the trailer $Z_1$ or the trailer $Z_2$. Thus, if the loader attempted to load the cartons 70 into the cargo space of the trailer $Z_1$ with two of the panels 73 and three of the panels 72 facing him, the total width of the cartons in the transverse row would equal 92 inches, which is one inch longer than the width of the cargo space of the trailer $Z_1$. This would immediately tell the loader that the wrong loading pattern was being used and he would, therefore, resort to the loading pattern defined by the numbers "3" and "2" below the numbers "2" and "3" on the panels 73 and 72, respectively. In other words, the loader would then follow the loading pattern indicated by the lower numbers of the superposed pair and the symbols $S_3$ and $S_4$. He would thus load three of the cartons 70 with the panels 73 thereof facing him and two of the cartons with the panels 72 thereof facing him to obtain the loading pattern illustrated in FIG. 10.

The graphic instructions provided by the symbols $S_3$ and $S_4$ would prevent the loader from inadvertently loading the cartons 70 into the cargo space of the trailer $Z_2$ in the pattern thereof illustrated in FIG. 10 since he would always initially attempt to load the cartons according to the upper two numerals of the superposed pair in the symbols $S_3$ and $S_4$. Consequently, if the loader followed these directions and initially attempted to load three of the cartons 70 into the cargo space of the trailer $Z_2$ with the panels 72 facing him and two of the cartons with the panels 73 facing him, the loading pattern illustrated in FIG. 11 would be obtained. This pattern is, as previously described, the proper pattern for substantially maximizing the number of cartons in the cargo space of the trailer $Z_2$.

Figure 12:
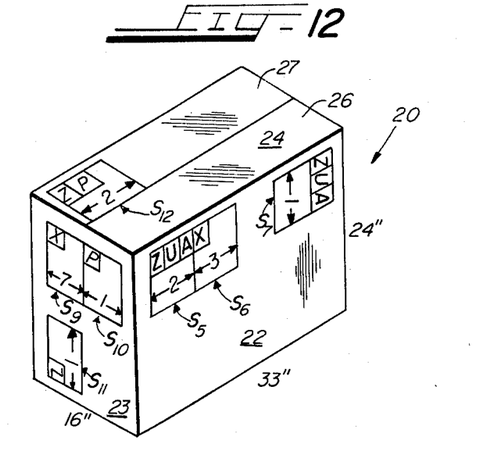
FIG. 12 is a perspective view of another carton having a plurality of loading symbols embodying the features of the present invention applied to different panels thereof, the symbols on the panels of the carton in FIG. 12 containing graphic instructions for loading a plurality of the cartons in the cargo receiving spaces of several different types of vehicles and in patterns which substantially maximize the number of cartons in the cargo carrying spaces of the respective vehicles.

Referring now to FIG. 12, a cargo element in the form of a carton is illustrated having a plurality of the symbols embodying the features of the present invention applied to the outer surfaces of the panels thereof to provide graphic instructions for loading the carton in the cargo receiving spaces of a number of different vehicles. It will be assumed that the carton illustrated in FIG. 12 is of the same dimensions as the carton 20 illustrated in FIG. 1 i.e. 33 inches long, 16 inches wide and 24 inches high. Consequently, like reference numerals have been used to identify the parts of the carton illustrated in FIG. 12 which are identical to those of the carton 20 illustrated in FIG. 1.

According to the present invention, the carton 20 illustrated in FIG. 12 includes graphic means in the form of a plurality of symbols on the outer surfaces of the side panel 22, end panel 23 and top panel 24 providing graphic instructions to a loader for loading a plurality of the cartons 20 in the cargo receiving spaces of a plurality of vehicles as, for example, a 40 ft. long highway trailer, 20 ft. and 40 ft. long ocean containers, "high cube" trailers, 40 ft. and 50 ft. length boxcars, type M-1 and type M-2 aircraft containers and private van vehicles, for example, vans which are 27 ft. long, 7 ft. wide, and 7 ft. 2 inches high. To this end, the panel 22 of the container 20 includes a pair of adjoining, symbols $S_5$ and $S_6$ in the upper left hand corner thereof, and another symbol $S_7$ in the upper right hand corner thereof, as viewed in FIGS. 12 and 13. The end panel 23 of the carton 20 also includes a pair of adjoining symbols $S_9$ and $S_{10}$ adjacent to the upper edge of the panel, as viewed in FIG. 14, and another symbol $S_{11}$ adjacent to the lower left hand corner of the panel 23. The top panel 24 of the carton 20 includes a symbol $S_{12}$ in the upper left hand corner thereof as viewed in FIG. 15.

Figure 13:
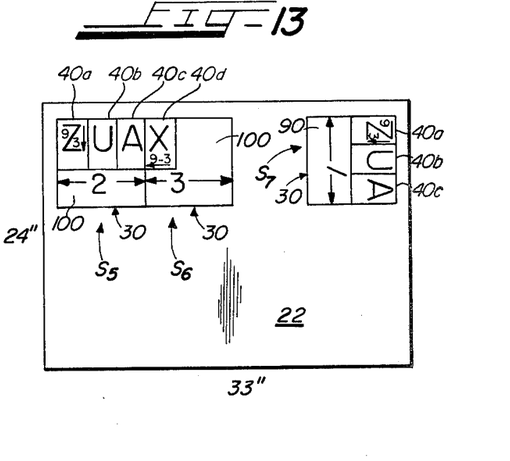
FIGS. 13, 14 and 15, are elevational views of the side, end and top panels, respectively, of the carton illustrated in FIG. 12.

Referring initially to FIG. 13 in conjunction with FIG. 12, it will be seen that the symbol $S_5$ is in the form of a rectangle 30, preferably a square having a plurality of smaller rectangles, resindicated at 40a, 40b and 40c, extending across the upper portion thereof. In the present instance, the rectangles 40a, 40b and 40c respectively enclose the letters "Z", "U" and "A". In addition, the numerals "9" and "3" are provided in the open spaces of the letter "Z" and a downwardly directed arrow is disposed adjacent the number "3" in the rectangle 40a. Further, the number "2" appears in the open space, indicated at 100, of the symbol $S_5$, and a pair of arrows extend in opposite directions from the numeral "2".

The letters "Z" and "U" thus indicate that the carton 20 can be loaded into the cargo space of either a highway trailer or an ocean container, specifically a highway trailer and a 40 ft. ocean container in which the cargo receiving spaces thereof are approximately 464 to 477 inches long, 92 to 94 inches wide, and 99 to 112 inches high. The numbers "9" and "3" adjacent to the "Z", together with the downwardly directed arrow, indicate that the carton should only be loaded in highway trailers with the panel 22 thereof oriented with the longer dimension thereof extending horizontally when the internal height of the cargo space of the trailer is 9 ft. 3 inches or less.

The letter "U" also indicates that the carton 20 can be loaded into an ocean container in which the cargo receiving space thereof is approximately 232 inches long, 90 inches wide and 89 inches high. No supplemental indicia or numerals are provided adjacent to the letter "U" since the loading pattern of the cartons 20 in both 20 ft. and 40 ft. long ocean containers is the same. However, if the loading pattern were different for either a 20 ft. or 40 ft. long ocean container, then some appropriate indicia, for example the numbers "20" and "40", could be enclosed within the "U" to identify the different patterns.

The location of the smaller rectangles 40a and 40b across the top of the rectangle 30 of the symbol $S_5$, and the conventional orientation of the letters "Z" and "U" therein, graphically instruct a loader as to the proper orientation of the panel 22 of the carton 20 when the letter is loaded in the cargo receiving spaces of highway trailers and ocean containers having the aforementioned dimensions.

The letter "A" in the rectangle 40c indicates that the cartons 20 can be loaded into the cargo space of either a type M-1 or type M-2 aircraft container, the dimensions of the cargo spaces of which are approximately 121 inches long, 90 inches wide and 92 inches high, and 232 inches long, 90 inches wide and 89 inches high, respectively. Thus, the dimensions of the cargo space of a type M-2 aircraft container are substantially the same as those of a 20 ft. ocean container. No supplemental indicia or numerals are provided adjacent to the letter "A" in the rectangle 40c since the loading pattern for the cartons 20 in type M-1 and type M-2 air-craft containers is the same. However, if the loading patterns were different for either type M-1 or type M-2 aircraft containers, then some appropriate indicia, for example the letters and numbers "M-1" and "M-2," could be positioned adjacent to the letter "A" to identify the different patterns. The orientation of the letter "A" in the rectangle 40c is the same as that of the letters "Z" and "U" in the rectangles 40a and 40b.

The symbol $S_6$ is likewise in the form of a rectangle 30, preferably a square having a smaller rectangle, indicated at 40d, in the upper left hand quadrant thereof in the manner of the symbol S. The smaller rectangle 40d of the symbol $S_6$ encloses the letter "X", and the numbers "9" and "3" are disposed in the lower open area of the "X". In addition, a horizontally extending arrow is disposed below the numerals "9" and "3", with the head of the arrow extending toward the left as viewed in FIG. 13. Further, the number "3" appears in the open space, indicated at 100, of the symbol $S_6$, and a pair of arrows extend in opposite, horizontal directions from the numeral "3".

The letter "X" in the rectangle 40d indicates that the carton 20 is to be loaded in the cargo space of a boxcar, and the numbers "9" and "3", together with the horizontally extending arrow immediately below, which points to the left, indicates that three cartons 20 are to be loaded with the panels 22 thereof oriented as illustrated in FIG. 13 in boxcars having a width 9 ft. 3 inches (111 inches) or less.

The symbol $S_7$ on the panel 22 is similar to the symbol $S_5$ in that it likewise includes three smaller rectangles 40a, 40b and 40c, which extend downwardly in the right side portion of the rectangle 30, as viewed in FIG. 13, and in which the letters "Z", "U" and "A" are enclosed. In addition, the numbers "9" and "3", and a horizontally directed arrow are also provided in the rectangle 40a. Thus, the symbol $S_7$ applies to the same vehicles as the symbol $S_5$, i.e. highway trailers less than 9 ft. 3 inches high, ocean containers and aircraft containers.

The symbol $S_7$ differs from the symbol $S_5$ in that the symbol $S_7$ is rotated 90° in a clockwise direction from the position of the symbols $S_5$ and $S_6$. In addition, the symbol $S_7$ has the number "1," and a pair of oppositely directed, vertically extending arrows in the open space 100 thereof, on either side of the number "1".

Figure 14:
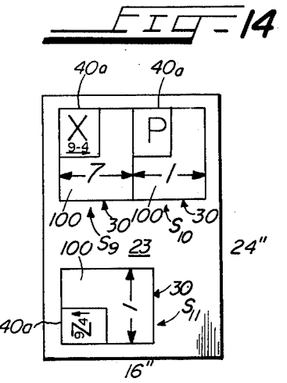

Referring now to FIG. 14 in conjunction with FIG. 12, it will be seen that the symbol $S_9$ is in the form of a rectangle 30, which is preferably a square, having a smaller rectangle 40a in the upper left quadrant thereof. The letter "X" is enclosed in the rectangle 40a and the numerals "9" and "4" are provided below the "X". A horizontally extending arrow is disposed below the numbers "9" and "4". The symbol $S_9$ is thus similar to the symbol $S_6$ in that the symbol $S_9$ provides graphic instructions for loading the cartons 20 in boxcars having a width 9 ft. 4 inches or greater. However, other than this condition, there is no restriction as to the length of the boxcars into which the cartons 20 may be loaded.

The symbol $S_9$ differs from the symbol $S_6$ in that the number "7" is provided in the open space 100 thereof and a pair of oppositely directed arrows extend horizontally from the "7". Thus, the symbol $S_9$ graphically instructs a loader that when the cartons 20 are to be loaded into a boxcar which is 9 ft. 4 inches wide, or wider, seven of the cartons are to be oriented in a transverse row across the boxcar with the 16 inch dimension of the carton extending horizontally and the 24 inch dimension of the carton extending vertically.

The symbol $S_{10}$ is similar to the symbol $S_9$ in that it is likewise in the form of a rectangle 30 having a smaller rectangle 40a in the upper left quadrant thereof as viewed in FIG. 14. The symbol $S_{10}$ differs from the other symbols in that the letter "P" is enclosed by the rectangle 40a. The letter "P" indicates that the carton 20 can be loaded into the cargo space of a private van the dimensions of the cargo space of which are approximately 27 ft. (324 inches) long, 7 ft. (84 inches) wide and 7 ft. 2 inches (96 inches) high.

The symbol $S_{10}$ also includes the number "1" in the space 100 thereof, together with a pair of oppositely directed, horizontally extending arrows. Thus, a loader is graphically instructed that when loading cartons into the cargo space of a private van, one of the cartons 20 must be oriented with the end panel 23 facing the loader and with the 24 inch dimension of the carton extending vertically.

The symbol $S_{11}$ is similar to the previous symbols in that it likewise includes a rectangle 30, which is substantially square, and a smaller rectangle 40a is provided in the lower left quadrant thereof, as viewed in FIG. 14. The letter "Z" is enclosed in the rectangle 40a with the "Z" rotated 90° in a counterclockwise direction from its conventional orientation. The numbers "9" and "4", together with a horizontally extending arrow, with the head thereof facing toward the left, as viewed in FIG. 14, are likewise enclosed in the rectangle 40a adjacent to the "Z". The number "1," together with a pair of oppositely extending, vertically arranged arrows, are provided in the open space 100 of the symbol $S_{11}$.

Thus, when the symbol $S_{11}$ is rotated 90 degrees in a clockwise direction from the orientation thereof shown in FIG. 14, this symbol provides graphic instructions to a loader that, when the cartons 20 are to be loaded into a "high cube" highway trailer i.e. a trailer in which the vertical height of the cargo space thereof is approximately 9 ft. 4 inches (112 inches) or greater, one of the cartons in each row must be oriented with the shortest dimension thereof, i.e. the 16 inch dimension, extending vertically and the 24 inch dimension extending horizontally.

Figure 15:
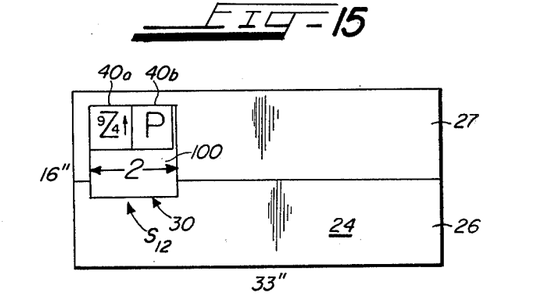

Referring now to FIG. 15 in conjunction with FIG. 12, it will be seen that the symbol $S_{12}$ is similar to the symbols $S_{11}$ and $S_{10}$ in that it is also in the form of a rectangle 30, preferably a square having two smaller rectangles across the upper portion thereof, respectively indicated at 40a and 40b. In the present instance, the rectangle 40a encloses the letter "Z", the numerals "9" and "4" are enclosed in the open spaces of the letter "Z", and an upwardly directed arrow is disposed adjacent to the number "4". Thus, the symbol $S_{12}$ also provides graphic instructions for loading the cartons 20 in a "high cube" highway trailer, the vertical height of the cargo space thereof being assumed to be approximately 9 ft. 4 inches or greater.

The symbol $S_{12}$ is similar to the symbol $S_{10}$ in that the letter "P" is enclosed in the rectangle 40b. The symbol $S_{12}$ thus also provides graphic instructions for loading the cartons 20 into the cargo space of a private van. In addition, the number "2" appears in the open space 100 of the symbol $S_{12}$, and a pair of arrows extend in opposite directions from the numeral "2" in a horizontal direction.

The symbol $S_{12}$ thus provides graphic instructions to a loader for loading two of the cartons 20 in either a "high cube" highway trailer or in a private van in which the internal dimensions of the cargo space are as previously described. The cartons 20 are properly oriented in either a "high cube" trailer or private van when the rectangles 40a and 40b extend across the upper portion of the rectangle 30 with the top panel 24 of each carton facing the loader. In other words, two of the cartons should be loaded transversely across the width of the cargo space with the 33 inch dimension extending horizontally and the 16 inch dimension extending vertically.

In summary, the symbols $S_5$–$S_7$ and $S_9$–$S_{12}$ on the carton 20 illustrated in FIG. 12 provide graphic instructions to a loader as to the number and orientation of the cartons in each transverse row of the cargo space of the vehicles in which the cartons are to be loaded so as to maximize the number of cartons that can be loaded into the cargo spaces of the various vehicles identified by the letters and numbers in the smaller rectangles 40a–40d of the symbols. Moreover, the symbols $S_5$–$S_7$ and $S_9$–$S_{12}$ provide different loading patterns for standard height and high cube trailers as well as for boxcars which are 9 ft. 3 inches or less in width, and for boxcars which are 9 ft. 4 inches wide, or wider. Since the loading patterns for 20 ft. and 40 ft. long ocean containers, as well as for M-1 and M-2 aircraft containers are the same, the loading patterns provided by the symbols $S_5$ and $S_7$ are applicable for loading cartons in the cargo spaces of each of the aforementioned vehicles.

It is believed apparent that, if the multiple symbol arrangement illustrated in FIGS. 12–15, inclusive, were used on cartons having dimensions different from those of the carton 20, the numerals associated with the letters "Z" and "X" of the symbols $S_5$, $S_6$, $S_7$, $S_9$, $S_{11}$ and $S_{12}$ might not be necessary since the loading patterns for some sizes of cartons might be the same for the cargo receiving spaces of different sizes of trailers and boxcars.

Figure 16:
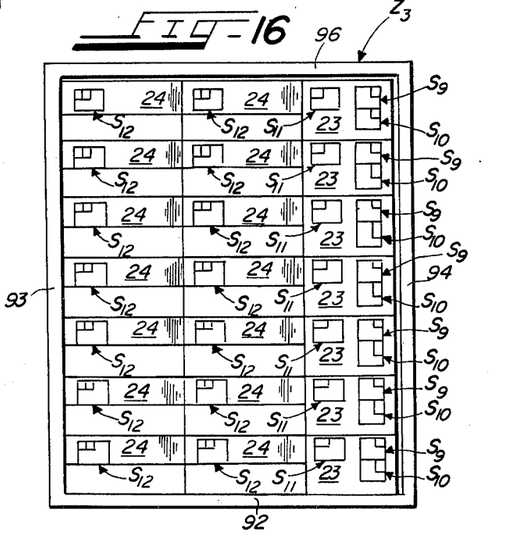
FIG. 16 is a diagrammatic elevational view, looking into the open rear end of a "high cube" highway trailer and showing a plurality of the cartons illustrated in FIG. 12 as they would appear when loaded in a pattern which substantially maximizes the number of cartons in the cargo space of the trailer.

Referring now to FIG. 16 in conjunction with FIGS. 12–15, inclusive, a plurality of the cartons 20, illustrated in FIGS. 12–15, inclusive, are shown as they would appear when loaded into the cargo carrying space of a "high cube" highway trailer, indicated generally at $Z_3$. The cargo carrying space of the high cube trailer $Z_3$ is defined by a floor 92, laterally spaced, vertically extending left and right side walls 93 and 94, respectively, and a ceiling or roof 96. It will be assumed that the internal dimensions of the cargo space of the high cube trailer $Z_3$ are 470 inches long, 92 inches wide and 113 inches high.

Assuming that freight handler or loader has been instructed to load as many of the cartons 20 into the cargo space of the high cube trailer $Z_3$ as possible and without any restriction as to the orientation of the cartons in the cargo space, he need only observe the graphic instructions provided on the panels of the cartons 20 pertaining to high cube trailers in order to obtain the desired optimum loading pattern. Thus, since the loader knows that the cartons are to be loaded into a high cube trailer, the vertical height of which will be assumed to be 9 ft. 4 inches (112 inches) or greater, he merely has to examine one of the cartons having the symbols $S_5$–$S_7$ and $S_9$–$S_{12}$ thereon to locate the symbols in which the letter "Z" appears in the smaller rectangles 40a–40c thereof, and in which the numbers "9" and "4" appear in proximity to the letter "Z" together with an upwardly directed arrow. As will be apparent from FIGS. 13, 14 and 15, the symbols $S_{11}$ and $S_{12}$ on the end panel 23 and top panel 24 satisfy these conditions. Accordingly, the loader would load one of the cartons 20 into the cargo space of the trailer $Z_3$ with the 16 inch dimension extending vertically and the intermediate, 24 inch dimension extending horizontally, as instructed by the symbol $S_{11}$. Cartons loaded in accordance with the graphic instructions provided by the symbol $S_{11}$ are illustrated in stacked relation adjacent to the vertical wall 94 of the trailer $Z_3$ in FIG. 16.

The loader would also load two of the cartons 20 in the cargo space of the trailer $Z_3$ with the 33 inch dimension extending horizontally and the 16 inch dimension extending vertically, in accordance with the graphic instructions provided by the symbol $S_{12}$. When so loaded, the end panels 24 of two of the cartons 20 in each row would face the loader, as illustrated in FIG. 16.

From the foregoing it will now be apparent that the symbols of the present invention provide graphic instructions to freight handling and loading personnel as to how cargo elements, such as the cartons 20 and 70, should be loaded into the cargo spaces of different vehicles in order to substantially maximize the number of cartons loaded in the space and also, where the cargo space is in a vehicle, how to minimize the clearance space between the cartons and the adjacent surfaces of the walls of the vehicle so as to minimize shifting and possible damage to cargo contained in the cartons during transit. Moreover, the loading instructions provided by the graphic symbols of the present invention are capable of compensating for variations in the size of the cargo receiving spaces of different freight vehicles, which is usually not possible in computer-generated written instructions or loading diagrams.

Method of Maximizing the Number of Cargo Elements Loaded in a Cargo Receiving Space From the foregoing description, it should also be apparent that a novel method of providing graphic instructions for loading a plurality of cargo elements in a cargo receiving space in a predetermined pattern such as to substantially maximize the number of cargo elements that can be loaded in the space has been disclosed. Such method contemplates the steps of determining the loading pattern which will substantially maximize the number of cargo elements that can be loaded into the cargo receiving space, applying one or more symbols to the outer surface of one or more of the panels of each of the cargo elements to be loaded so as to provide graphic instructions as to how the cargo elements are to be oriented while being loaded in the space to obtain the loading pattern, and loading the cargo elements into the cargo space in accordance with the instructions provided by the graphic symbols. Such method also contemplates the additional steps of associating letters, numbers and other indicia with the symbols to provide further graphic instructions for identifying the respective ones of a plurality of different types of vehicles in which the cargo elements can be loaded and the number and orientation of the cargo elements in each row thereof in the cargo receiving space of a particular vehicle so as to achieve the loading pattern.

From the foregoing description, it will now be apparent that the graphic means and method herein disclosed is not only capable of substantially maximizing the number of cargo elements or cargo containers that can be loaded in the cargo receiving spaces of vehicles, but is also capable of maximizing the number of cargo elements or containers that can be loaded in immovable cargo receiving spaces such as in buildings or warehouses.

It should also be understood that while the graphic means and method herein disclosed are most advantageous when used with cargo containers which are of cube-like form, but non-cubic, the symbols and method may also be used to advantage with cubic containers. Thus, the use of the graphic means and method of the present invention could be used to orient a cubic container or carton so that its contents would be properly positioned to absorb maximum impact and thereby reduce the possibility of damage to the cargo containers and their contents while in transit.

It should be pointed out that the numbers "9" and "3" as used in connection with the letter "Z" and the numbers "9" and "4" as used in connection with the letter "X" represent critical dimensions for a carton 20 having the dimensions mentioned herein, i.e. 33 inches long, 16 inches wide and 24 inches high. Thus, if the dimensions of the carton 20 were different from the aforementioned dimensions, different numbers might be used adjacent to the letters "Z" and "X" than those now shown in the symbols $S_5$, $S_6$, $S_7$, $S_9$, $S_{11}$ and $S_{12}$.

Throughout the specification, the symbols $S_1$, $S_2$, $S_3$, $S_4$, $S_5$, $S_6$, $S_7$, $S_9$, $S_{10}$, $S_{11}$ and $S_{12}$ have been described as being applied to only one of the side, end or top panels of the cartons 20 and 70. However, it is preferred that the same symbol be applied to both side panels, both end panels, and to the top and bottom panels of the cartons. Consequently, a loader will not have to rotate or roll a carton more than 90 degrees in any plane in order to be able to observe a particular symbol or symbols on the carton.

While one or more embodiments of the invention have been herein illustrated and described, it will be understood that modifications and variations thereof may be developed which do not depart from the spirit of the invention and the scope of the appended claims.

I claim:

1. The method of loading cargo elements in a cargo receiving space so that the number of cargo elements loaded in said space is substantially maximized, said cargo elements all having substantially the same dimensions, said method comprising the steps of determining the loading pattern which will substantially maximize the number of cargo elements in said cargo receiving space, applying the same graphic means to each of said cargo elements which means provides graphic instructions to a loader for loading said cargo elements in said space in said predetermined pattern, and loading said cargo elements in said cargo space in accordance with the instructions provided by said graphic means.

2. The method of claim 1, which includes the additional steps of forming said graphic means so that the orientation thereof is recognizable, and applying said means to each of said cargo elements in an orientation which will provide said predetermined pattern when said cargo elements are loaded in said cargo receiving space with the graphic means on said cargo elements in the same orientation and facing in the same direction.

3. The method of claim 2, which includes the additional step of loading said cargo elements in tiers of rows extending transversely across said cargo space until said loading pattern is completed.

4. The method of claim 3, wherein each of said cargo elements has a plurality of outer surfaces said graphic means comprises at least one symbol, and said method includes the additional step of applying at least two symbols to one of the outer surfaces of each of said cargo elements so as to provide graphic instructions to a loader for loading said cargo elements in different orientations in each of said transverse rows.

5. The method of claim 4, which includes the additional steps of adding numerals to each of the symbols applied to said one surface of each of said cargo elements to provide graphic instructions to a loader as to the number of cargo elements to be loaded in each transverse row.

6. The method of claim 5, which includes the additional step of applying said numerals to the symbols on said one surface of each of said cargo elements in the same orientation as the symbol with which it is associated.

7. The method of loading cargo elements in one or the other of at least two cargo receiving spaces and in one or the other of at least two loading patterns so that the number of cargo elements loaded in each of said spaces is substantially maximized, said cargo elements wall having substantially the same dimensions, said method comprising the steps of determining the loading pattern which will substantially maximize the number of cargo elements in each of said cargo receiving spaces, applying a pair of symbols having recognizable orientations to a surface on each of said cargo elements in orientations which will provide the loading pattern for substantially maximizing the number of cargo elements in each transverse row of each cargo receiving space, applying a first set of numerals to each of the symbols on each cargo element to provide graphic instructions as to the number of cargo elements to be loaded in each transverse row to obtain one of said loading patterns, applying a second set of numerals to each of the symbols on each cargo element in a different location than said first set of numerals, said second set of numerals providing graphic instructions as to the number of cargo elements to be loaded in each transverse row to obtain the other of said loading patterns, and loading said cargo elements in tiers of transverse rows in said cargo receiving spaces in accordance with the loading instructions provided by the orientations of said symbols and the numerals of said first and second sets until the loading pattern for maximizing the number of cargo elements in each of said cargo receiving spaces is obtained.

8. The method of claim 7, including the additional steps of arranging the numerals of said first set in one location on each of the symbols on each of said cargo elements, and arranging the numerals of said second set in another location on each of the symbols on each of said cargo elements and adjacent to the numerals of said first set.

9. The method of claim 8, including the additional step of arranging the numerals of said first and second sets in vertically spaced relation.

10. The method of loading cargo elements in the cargo receiving space of one or more of a plurality of vehicles so that the number of cargo elements loaded in the cargo receiving space of each vehicle is substantially maximized, said cargo elements all having substantially the same dimensions, said method comprising the steps of determining the loading pattern which will substantially maximize the number of cargo elements that can be loaded in the cargo receiving space of each of said vehicles, applying one or more symbols to one or more of the surfaces of each of said cargo elements in orientations which will provide the loading pattern for substantially maximizing the number of cargo elements in each transverse row of the cargo receiving space of one or more of said vehicles, applying first indicia to one or more of the symbols on each of said cargo elements to identify the symbol or symbols pertaining to one or more of the vehicles to be loaded, applying second indicia to one or more of the symbols on each of said cargo elements to provide graphic instructions as to the number of cargo elements to be loaded in each transverse row of the cargo receiving space of each of said vehicles to obtain the loading pattern which will substantially maximize the number of cargo elements loaded in one or more of said vehicles, and loading said cargo elements in tiers of transverse rows in the cargo receiving space of a particular one of said plurality of vehicles in accordance with the loading instructions provided by the orientations of the symbols on said cargo elements pertaining to the particular vehicle being loaded and the first and second indicia on said symbols.

11. In combination with a plurality of cargo elements, a cargo receiving space of known dimensions, said cargo elements all having substantially the same dimensions and there being a predetermined loading pattern such as will substantially maximize the number of said cargo elements in said cargo receiving space when said elements are loaded in said pattern, and graphic means carried by each of said cargo elements and providing graphic instructions to a loader for loading said cargo elements in said pattern, said graphic means comprising at least one symbol on each of said cargo elements and providing graphic instructions to a loader as to how the cargo elements should be arranged and oriented in said cargo receiving space to obtain said predetermined loading pattern, whereby a cargo loader or freight handler can rapidly load cargo elements into said cargo receiving space and so that the number of cargo elements loaded therein is substantially maximized merely by following the graphic instructions provided by the symbols on said cargo elements.

12. The combination of claim 11, in which each of said cargo elements has a plurality of outer surfaces, said symbol is applied to a particular one of the outer surfaces of each cargo element and in a particular orientation such that said cargo elements are in said predetermined pattern when said symbols are all facing in the same direction and in said particular orientation.

13. The combination of claim 12, in which each of said cargo elements is defined by a plurality of adjoining panels having outer surfaces, the cargo elements defined by said panels being of cube-like form, and said symbol is applied to the outer surface of a particular one of the panels of each cargo element.

14. The combination of claim 12, in which said predetermined pattern includes at least one row of cargo elements extending transversely of said cargo receiving space, and one or more of said symbols are applied to one or more of the outer surfaces of each cargo element to provide graphic instructions for orienting each of the cargo elements in said row.

15. The combination of claim 14, in which a plurality of said rows of cargo elements are arranged in tiers across said cargo receiving space, the cargo elements in said rows and tiers being in said predetermined pattern when the symbols on the cargo elements in each of said rows and tiers are all facing in the same direction and in said particular orientation.

16. The combination of claim 11, in which said symbol includes a first portion and a second portion coacting with said first portion to render the orientation of said symbol recognizable.

17. The combination of claim 16, in which said first portion of said symbol comprises a rectangle.

18. The combination of claim 17, in which said second portion comprises another rectangle.

19. The combination of claim 18, in which said second rectangle is smaller than and enclosed by said first rectangle.

20. The combination of claims 18 or 19, in which said cargo receiving space is provided in a vehicle, and a letter is provided in said second rectangle to graphically identify said vehicle.

21. The combination of claim 20, in which a plurality of said second rectangles are provided in said first rectangle, and a letter is provided in each of said second rectangles to identify particular ones of a plurality of vehicles in which said cargo elements can be loaded.

22. The combination of claim 19, in which said first rectangle has four sides, adjoining pairs of which define right angles, said second rectangle has four sides, adjoining pairs of which define right angles, and two of the adjoining sides of said second rectangle are coincident with portions of two of the adjoining sides of said first rectangle.

23. The combination of claim 22, in which said first and second rectangle are squares.

24. The combination of claims 19, 22, or 23, in which said second rectangle is located in the upper left quadrant of said first rectangle when said cargo element is properly oriented in said cargo receiving space.

25. The combination of claim 24, in which said first and second rectangles define a space therebetween and indicia is located in said last mentioned space providing additional graphic instructions as to the proper orientation of said cargo elements in said cargo receiving space.

26. The combination of claim 25, in which said indicia comprises a pair of oppositely directed arrows, and said arrows extend horizontally when said symbol and said cargo element are properly oriented in said cargo receiving space.

27. The combination of claim 19, in which said cargo elements are adapted to be loaded in transverse rows across said cargo space, said first and second rectangles define a space therebetween, and a numeral is provided in said last mentioned space and providing graphic instructions to a cargo loader as to the number of cargo elements to be loaded in each transverse row.

* * * * *